(12) United States Patent
Håkansson

(10) Patent No.: US 10,384,805 B2
(45) Date of Patent: Aug. 20, 2019

(54) OPTIMIZING RANGE OF AIRCRAFT DOCKING SYSTEM

(71) Applicant: ADB SAFEGATE SWEDEN AB, Malmö (SE)

(72) Inventor: Ola Håkansson, Lomma (SE)

(73) Assignee: ADB SAFEGATE SWEDEN AB, Malmö (SE)

(*) Notice: Subject to any disclaimer, the term of this patent is extended or adjusted under 35 U.S.C. 154(b) by 0 days.

(21) Appl. No.: 16/086,972

(22) PCT Filed: Mar. 7, 2017

(86) PCT No.: PCT/EP2017/055292
§ 371 (c)(1),
(2) Date: Sep. 20, 2018

(87) PCT Pub. No.: WO2017/162432
PCT Pub. Date: Sep. 28, 2017

(65) Prior Publication Data
US 2019/0106223 A1      Apr. 11, 2019

(30) Foreign Application Priority Data

Mar. 21, 2016  (EP) ................................ 16161329

(51) Int. Cl.
*B64F 1/00*       (2006.01)
*G01S 17/42*     (2006.01)
(Continued)

(52) U.S. Cl.
CPC ............ *B64F 1/002* (2013.01); *G01S 7/4802* (2013.01); *G01S 17/42* (2013.01); *G08G 5/0026* (2013.01); *G08G 5/065* (2013.01)

(58) Field of Classification Search
CPC ..... G01S 7/4802; G01S 17/42; G08G 5/0026; G08G 5/065
(Continued)

(56) References Cited

U.S. PATENT DOCUMENTS 6,023,665 A   2/2000  Millgard
6,282,488 B1  8/2001  Castor et al.
(Continued)

FOREIGN PATENT DOCUMENTS

DE   4301637 A1   8/1994
EP   2124213 A1  11/2009
(Continued)

OTHER PUBLICATIONS

Safegate Group, "Safegate Group—SafePerformance—Global Description", Jan. 24, 2014, XP055303607, Retrieved from the Internet: <URL:https://web.archive.org/web/20140124172949/http://www.safegate.com/data/safegate/files/file_element/40f3e9dd1d4e37be3f1f54107343d5ea/SafePerformance_Global_Desc_130719_LR.pdf>.
(Continued)

*Primary Examiner* — Daryl C Pope
(74) *Attorney, Agent, or Firm* — Moser Taboada

(57) ABSTRACT

The present invention relates to an aircraft docking system comprising: a light based verification and positioning system adapted to scan a volume (120) in connection to a stand, a receiving unit adapted to receive surveillance data from an airport surveillance system, wherein the light based verification and positioning system is further adapted to control the extension of the scanned volume based on the received surveillance data.

13 Claims, 5 Drawing Sheets

(51) Int. Cl.
  *G08G 5/06* (2006.01)
  *G08G 5/00* (2006.01)
  *G01S 7/48* (2006.01)

(58) Field of Classification Search
  USPC ........ 340/958; 702/151, 152, 159; 356/3.14; 382/216
  See application file for complete search history.

(56) References Cited

U.S. PATENT DOCUMENTS

| | | | |
|---|---|---|---|
| 6,563,432 | B1 | 5/2003 | Millgaard |
| 7,059,569 | B1* | 6/2006 | Beyerle .................. B64D 7/00 244/137.1 |
| 2002/0021247 | A1 | 2/2002 | Smith et al. |
| 2002/0030609 | A1 | 3/2002 | Baumgartner et al. |
| 2004/0059497 | A1* | 3/2004 | Sankrithi ................ B64C 25/50 701/120 |
| 2004/0132495 | A1 | 7/2004 | Horton, Jr. et al. |
| 2008/0098538 | A1 | 5/2008 | Hutton |
| 2008/0231472 | A1 | 9/2008 | Hutton |
| 2010/0052973 | A1 | 3/2010 | Fabre et al. |
| 2013/0060457 | A1 | 3/2013 | Breuing |
| 2016/0304217 | A1* | 10/2016 | Fisher .................. B64C 39/024 |

FOREIGN PATENT DOCUMENTS

| | | |
|---|---|---|
| EP | 2660153 A2 | 11/2013 |
| JP | 2009530181 A | 8/2009 |
| JP | 2013101651 A | 5/2013 |
| KR | 20130122579 A | 7/2013 |
| WO | WO-2013141605 A1 | 9/2013 |

OTHER PUBLICATIONS

International Search Report dated Jun. 12, 2017 for PCT Application No. PCT/EP2017/055292.

International Preliminary Report on Patentability dated Jun. 18, 2018 for PCT Application No. PCT/EP2017/055292.

* cited by examiner

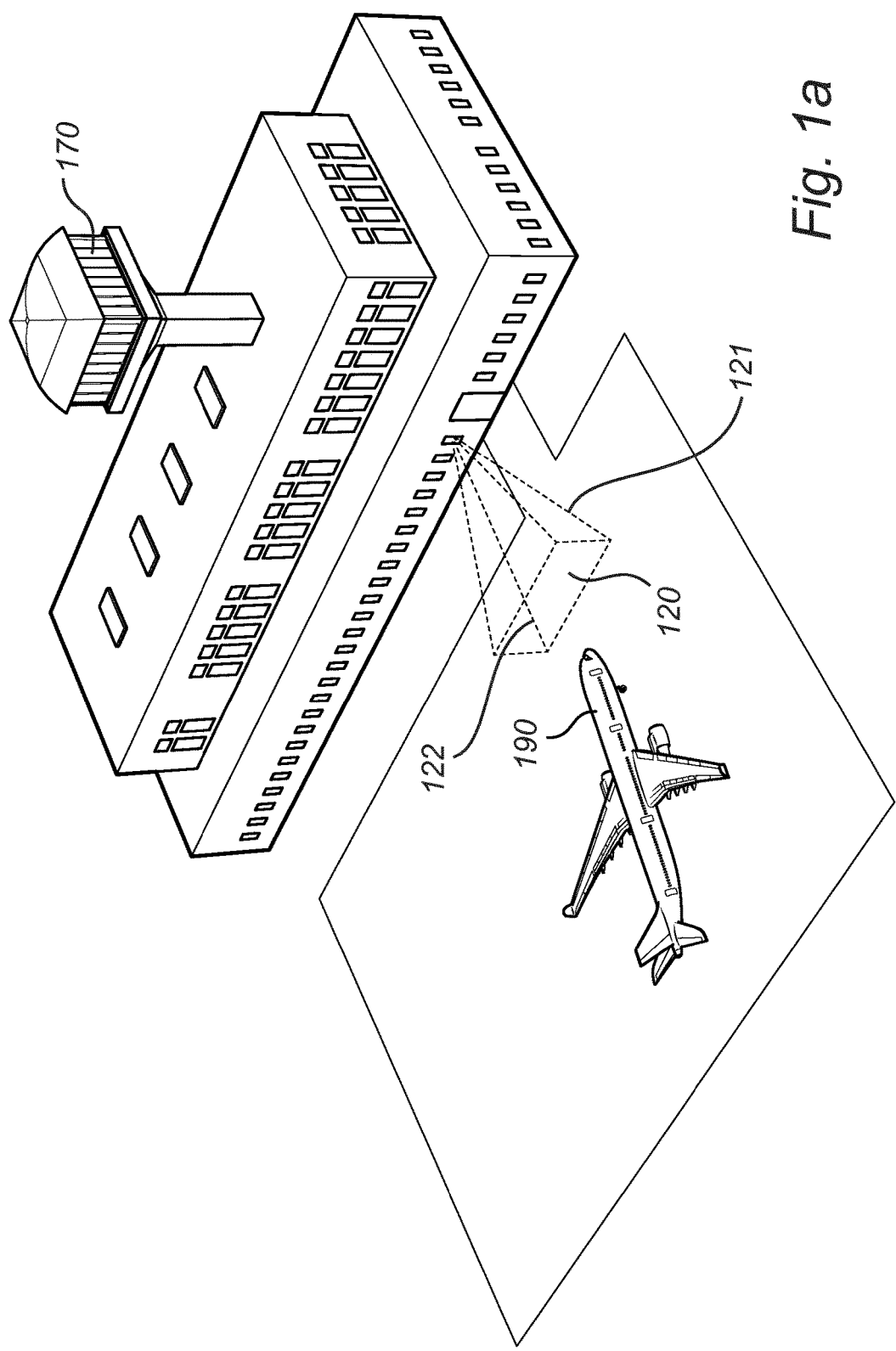

OPTIMIZING RANGE OF AIRCRAFT DOCKING SYSTEM

TECHNICAL FIELD

The present invention generally relates to aircraft docking systems, and in particular to an aircraft docking system adapted to receive information from an airport surveillance system, and use the received information in controlling a light based verification and positioning system in the process of guiding an airplane to a stand.

BACKGROUND OF THE INVENTION

At larger airports it is common to use boarding bridges in order to facilitate the transfer of passengers to and from aircrafts. Normally the boarding bridges are adjustable in height and are telescopically extensible such that passengers may enter or exit the aircraft without being exposed to weather, and without having to enter the docking area or stand where the aircraft is parked.

In order to make it possible to attach the boarding bridge to the aircraft, the aircraft must be guided to a predetermined stop position at the stand. Generally, the pilot is guided by a lead-in line painted on the ground, which ends in a predetermined stopping position. Additionally, since the view of the stand or docking area is limited from within the cockpit of the aircraft, the pilot is normally guided by either personnel on the ground or, as in more recent years, by a visual docking guidance system (VDGS).

A VDGS typically operates by emitting light pulses, e.g. laser pulses, from a location in connection to the stand, e.g. on the terminal building. The light pulses are normally emitted in a direction along the lead-in line, wherein an approaching aircraft following the lead-in line will reflect the light pulses towards a detector. A control unit in the VDGS may then calculate the distance to the aircraft as it approaches the stopping position. Alternatively, a more complex scanning of the volume in the stand area may be performed by directing the light pulses in different directions in the stand area such that different parts of the approaching aircraft reflects the light pulses, wherein not only the distance to the aircraft may be determined, but also the aircraft type may be identified by analyzing the reflections.

Additionally, the VDGS may include a display arranged, e.g. on the terminal building, at a location where it is clearly visible to the pilot, wherein the display may provide guidance, by means of characters and/or symbols, to the pilot while maneuvering the aircraft to the stopping position.

However, the range of the VDGS is limited for a number of reasons. The maximum energy in the light pulses must be limited in order to comply with laser eye safety regulations. As can be understood, the pilot in an approaching aircraft will be directly exposed to the light pulses, which could lead to eye injuries should the light energy be too high. The same applies to personnel working on the ground in the stand area.

Further, the atmospheric conditions in the stand area affect the range of the VDGS. The atmosphere attenuates, absorbs and scatters the light pulses, especially in situations where the weather conditions include fog or heavy rain. Thus, the effective range of a laser equipped VDGS is normally in the range of 100-200 m under ideal conditions.

It is important that an approaching aircraft is detected as early as possible when travelling towards the parking position (at the stopping point). This is especially important from a safety perspective, wherein the approaching aircraft must approach the stand in a manner which minimizes the risk for it coming into contact with objects on the ground as well as the bridge and the terminal building itself. An early detection makes it possible to provide better guidance to the pilot, and also makes it possible for the VDGS to make a better determination of the type and/or version of aircraft that is approaching. The latter is especially important as the boarding bridge must be aligned correctly to the aircraft once it reaches the stopping point.

The operation of the VDGS may roughly be divided into two stages: a capture stage where the VDGS scans the volume in connection to the stand in order to detect/find an aircraft, and a tracking stage where the VDGS has found an object/aircraft and seeks to determine the type and/or version of the aircraft, as well as guiding the aircraft to the stopping point. During the capture stage the VDGS may need to scan over a large volume depending on the layout of the airport and in particular depending on the arrangement of the stands, i.e. some stands may cover large area (normally an area corresponding at least to the size of the largest expected aircraft, e.g. an 80 m by 80 m square), wherein the range of the VDGS must be large in order to reach to the far end of stand. Additionally, the VDGS must be able to scan over a great angle in order to capture objects (aircraft) approaching from the sides.

Attempts have been made to provide early detection of aircrafts by arranging the VDGS further into the stand area, away from the stopping point, such as on a separate post in connection to the entry point of the stand area, or on a portion of the boarding bridge closer to the entry point of the stand area. However, since it is desirable to minimize the number of objects in the stand area both esthetic and safety considerations strongly limit the feasibility of such arrangements.

Accordingly, there exists an unfulfilled need for a system and method for identifying and guiding an aircraft to a stopping position. There furthermore exists an unfulfilled need for such a system and method, which provides reliable operation even under unfavorable environmental conditions such as fog, heavy rain, snow etc., and that reduces the potential for incorrectly identifying the aircraft type to be parked.

SUMMARY OF THE INVENTION

In view of the above, an objective of the invention is to provide system and method for optimizing and under favorable circumstances also increasing the effective range of the VDGS without increasing the energy in the emitted light pulses to a possibly harmful level.

According to a first aspect, the present invention is implemented by means of an aircraft docking system comprising: a light, preferably laser, based verification and positioning system adapted to scan a volume in connection to a stand, a receiving unit adapted to receive surveillance data from an airport surveillance system, wherein the light based verification and positioning system is further adapted to control the extension of the scanned volume based on the received surveillance data.

An advantage with this embodiment is that the light based verification and positioning system may scan a volume of a certain extension based on the received surveillance data. That is, instead of blindly scanning a volume in connection to the stand, the light based verification and positioning system may use the received surveillance data in order to focus on scanning a volume determined to be of higher interest. By way of example, a volume may be determined to be of interest if the surveillance data indicates that an aircraft may be present, or will soon be present, in that volume. Thus, the light based verification and positioning system may, based on the data provided by the surveillance system, perform a very efficient scanning of a volume in connection to a stand. By the term "a volume in connection to a stand" is here meant a volume that substantially encloses a stand area. Aircraft may be parked within a stand area. The volume may have an extension such that it encloses an area that is larger than the stand, preferably in a direction towards a taxiway of the airport. The volume may be of different shapes depending on the arrangement of the light based verification and positioning system. The stand may be arranged in front of a terminal building such that passengers may enter and/or leave a parked aircraft. Alternatively or additionally the stand may be arranged at a location remote from a terminal building. The remote stand may be used for parking aircraft that are not in operation, or to embark/disembark passengers and/or goods for further transport from the remote stand area to another location.

An additional advantage is that by combining the received surveillance data with the data provided by scanning the volume in connection to the stand, the position of an aircraft may be determined with high precision anywhere on the airport. Additionally, cooperative sensors of the surveillance system also allow additional data about the approaching aircraft to be acquired such as for example an airplane unique identifier. Normally the surveillance system may determine the position of an aircraft on the runway or taxiway with high precision, but as the aircraft approaches the stand area, in particular in the vicinity of terminal buildings, the accuracy of the position data from the surveillance system deteriorates due to the presence of e.g. buildings or other structures that interfere with the sensors in the surveillance system (i.e. blocking radar pulses, causing misreading by reflections and multipath propagation/ghosting etc.).

In the preferred embodiment disclosed hereafter, the docking system utilizes a laser based verification and positioning system. It is emphasized that as an alternative, the docking system may be equipped with radar or optical means (e.g. a camera) for scanning the volume. In the former case, a radar antenna providing a sufficiently narrow radar beam may be utilized such that the resolution of the scan is sufficient for detecting and determining the position of an approaching aircraft. In the latter case a camera and associated image recognition software may be utilized for detecting and determining the position of the aircraft. As an alternative to laser, visible as well as infrared light may be used for emitting light to be reflected by an approaching aircraft.

The light based verification and positioning system may comprise at least one laser transmitter adapted to emit light in different directions in the volume, and a detector adapted to detect light reflected from objects in the volume.

An advantage with this embodiment is that a limited number, of laser transmitters may be used for scanning the entire volume, thereby making the system compact. Even a single transmitter adapted to scan the azimuth and elevation at a wide angle may be used for determining the position and type of an approaching aircraft. The at least one laser transmitter may be adapted to emit light in different directions such that a volume of a pyramidal (e.g. tetrahedron or pentahedron) shape may be scanned. Alternatively or additionally two or more laser transmitters may be used in conjunction and adapted to emit light in different directions such that volumes of other shapes, e.g. rectangular, may be scanned.

The light based verification and positioning system may be adapted to reduce the size of the scanned volume based on the received surveillance data.

An advantage with this embodiment is that a smaller volume may be scanned more rapidly. By way of example, the surveillance data may indicate that an aircraft may be present, or will soon be present, in a subvolume of the original volume in connection to the stand, whereby the system may focus the scanning to that smaller volume. By the term "reduce the size" is here meant that the system may be adapted to reduce the size of the scanned volume in any dimension depending on the shape of the scanned volume.

The light based verification and positioning system may be adapted to shift the scanned volume sideways based on the received surveillance data.

An advantage with this embodiment is that a volume which, based on the received surveillance data is determined to be of interest, may be scanned. By way of example, if the surveillance data indicates that an aircraft may be present, or will soon be present, in a volume displaced sideways from the current scanned volume, the system may shift the scanned volume sideways such that the volume of interest is scanned. By the term "sideways" is here meant that the system may perform a translatory movement of the volume in any direction or that the system may perform an angular displacement of the volume such that it is directed at a new azimuth or elevation angle.

The light based verification and positioning system may be adapted to scan a volume extending in a direction radially out from the laser verification and positioning system, the light based verification and positioning system adapted to reduce the size of the scanned volume by restricting the extension of the volume in the radial direction.

An advantage with this embodiment is that the system may reduce the size of the scanned volume such that it reaches a desired distance towards e.g. the taxiway of the airport. By way of example, the visual range at the stand may be restricted such that it is relevant to reduce the scanned volume in a direction radially out from the light based verification and positioning system. By the term "radially" is here meant that the direction extends radially out from a single laser transmitter. Alternatively or additionally, the radial direction is defined as a normal vector extending out from a group of transmitters arranged along a line. Alternatively or additionally, the radial direction is defined as a direction that extends radially out from a single laser transmitter among a group of transmitters.

The light based verification and positioning system may be adapted to scan a volume extending in a direction radially out from the light based verification and positioning system and in a direction transverse to the radial direction, the light based verification and positioning system adapted to reduce the size of the scanned volume by restricting the extension of the volume in the transverse direction.

An advantage with this embodiment is that a laterally or vertically smaller volume may be scanned more rapidly. By the term "transverse" is here meant that the system may reduce the width and/or the height of the scanned volume as seen in a direction from the light based verification and positioning system. By way of example, the system may be arranged to reduce the azimuth beam pattern such that the width of the scanned volume is reduced. Alternatively or additionally the system may be arranged to reduce the elevation beam pattern such that the height of the volume is reduced. Alternatively or additionally, one or more laser transmitters among a group of transmitters may be controlled to reduce their transmission power such that the transverse size of the volume is reduced.

The received surveillance data may comprise at least one of: identification data, type, version and position of an aircraft.

An advantage with this embodiment is that the aircraft docking system gets advance notice about an aircraft that is approaching the stand. The identification data, type and version of the aircraft may be used for determining the properties and appearance of the aircraft in order to facilitate the verification of the aircraft. Alternatively or additionally, the identification data, type and version of the aircraft may be used for querying an external database about the position of the aircraft. The position data may be used for controlling the extension of the scanned volume such that it is directed towards the aircraft and/or restricted to a subvolume in which the aircraft is residing or is expected to reside in soon. Alternatively or additionally the position data may be used for querying an external database about the identification data, type and/or version of the aircraft at the received position. The position data may be used to calculate a speed and course of the aircraft.

The received surveillance data may comprise information regarding current weather conditions at the airport.

An advantage with this embodiment is that the system may control the size and/or shape of the scanned volume depending on current weather conditions at the airport. By way of example, the prevailing weather conditions at the airport may restrict the visual range of the light based verification and positioning system, such as during heavy rain or snow, fog, etc. The system may in this situation determine to reduce the size of the scanned volume by reducing the range laser transmitter/detector since objects at a far distance are only detectable with a low probability.

The surveillance system may be at least one of: ground movement radar, ADS-B, Mode-S and GPS systems.

An advantage with this embodiment is that the aircraft docking system may receive data from systems that are already deployed at the airport. The receiver acts as an interface towards these systems in order to facilitate reliable control of the size and/or shape of the scanned volume.

The light based verification and positioning system may be adapted to detect the aircraft in the scanned volume.

An advantage with this embodiment is that the light based verification and positioning system may operate in a capturing state, wherein the control of the extension of the scanned volume is optimized for detection of an aircraft in the scanned volume. The scanned volume may have an extension in azimuth, elevation and range such that a reliable detection is facilitated. The extension of the scanned volume may be set such that at maximum range is achieved in order to detect an aircraft at a distance as far away as possible from the parking position in the stand. The extension of the scanned volume may be set such that a wide volume as possible is scanned should the received surveillance data indicate an uncertain position of the aircraft. The extension of the scanned volume may be set such that a narrow volume (in azimuth and/or elevation) is scanned should the received surveillance data indicate the position of the aircraft with high certainty.

The light based verification and positioning system may be adapted to verify the aircraft in the scanned volume.

An advantage with this embodiment is that once the aircraft has been detected in the volume, the system may control the extension of the volume such that a reliable verification of the aircraft is facilitated. The extension of the scanned volume may be set such that a narrow volume (in azimuth and/or elevation) is scanned in order to provide a high resolution reading [scan] of the object detected in the volume. Based on the received surveillance data the system may control the extension of the volume such that specific parts of the detected aircraft are scanned in order to detect distinguishing features of the aircraft. The received surveillance data may comprise information about the type and/or version of the aircraft, wherein the system may query an internal or external database in order to determine the relative position of distinguishing features (such as the engines) on the aircraft and further control the extension of the volume, i.e. focusing on the distinguishing features, such that a verification of the type and/or version of the aircraft is facilitated.

The processing unit may be adapted to control the light based verification and positioning system to verify at least one of identification data, type, and version of the aircraft.

An advantage with this embodiment is that the aircraft docking system, or any other entity operatively connected to the aircraft docking system, may take action based on the verification. The aircraft docking system may indicate to the pilot of the aircraft to stop the aircraft should the verification fail. The aircraft docking system may initiate a new scan of the extension-controlled volume should the verification fail.

The processing unit is adapted to retrieve type and/or version of the aircraft from a database based on said identification data.

An advantage with this embodiment is that maintenance of the system is facilitated. The database may be internal or external to the system. An internal database may be updated periodically or occasionally by means of a connection to an airport database system. The system may query an external database as occasion requires. An external database may be under supervision of an airport control authority thereby increasing the reliability of the data stored therein. The aircraft docking system may comprise an interface adapted to provide aircraft data to the surveillance system. The interface may be adapted to provide aircraft data to the surveillance system via a database.

An advantage with this embodiment is that by providing the surveillance system with aircraft data from the docking system, the position of an aircraft may be known to the surveillance system with high precision anywhere on the airport. Normally the surveillance system may determine the position of an aircraft on the runway or taxiway with high precision, but as the aircraft approaches the stand area, in particular in the vicinity of terminal buildings, the accuracy of the position data from the surveillance system deteriorates due to the presence of e.g. buildings or other structures that interfere with the sensors in the surveillance system (i.e. blocking radar pulses, causing misreading by reflections and multipath propagation/ghosting etc.). Since the surveillance system according to this embodiment receives aircraft data acquired by the docking system in the stand area, the above problems are mitigated.

The aircraft docking system may provide aircraft data that comprise at least one of: verified identification data, type, version and position of the aircraft.

An advantage with this embodiment is that the surveillance system may receive very detailed data about the aircraft in the stand area, thereby increasing the safety at the airport, and particularly in the stand area.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIGS. 1a and 1b are schematic views of an aircraft docking system 100 according to a first embodiment of the present invention;

DETAILED DESCRIPTION OF PREFERRED EMBODIMENTS

Figure 1B:
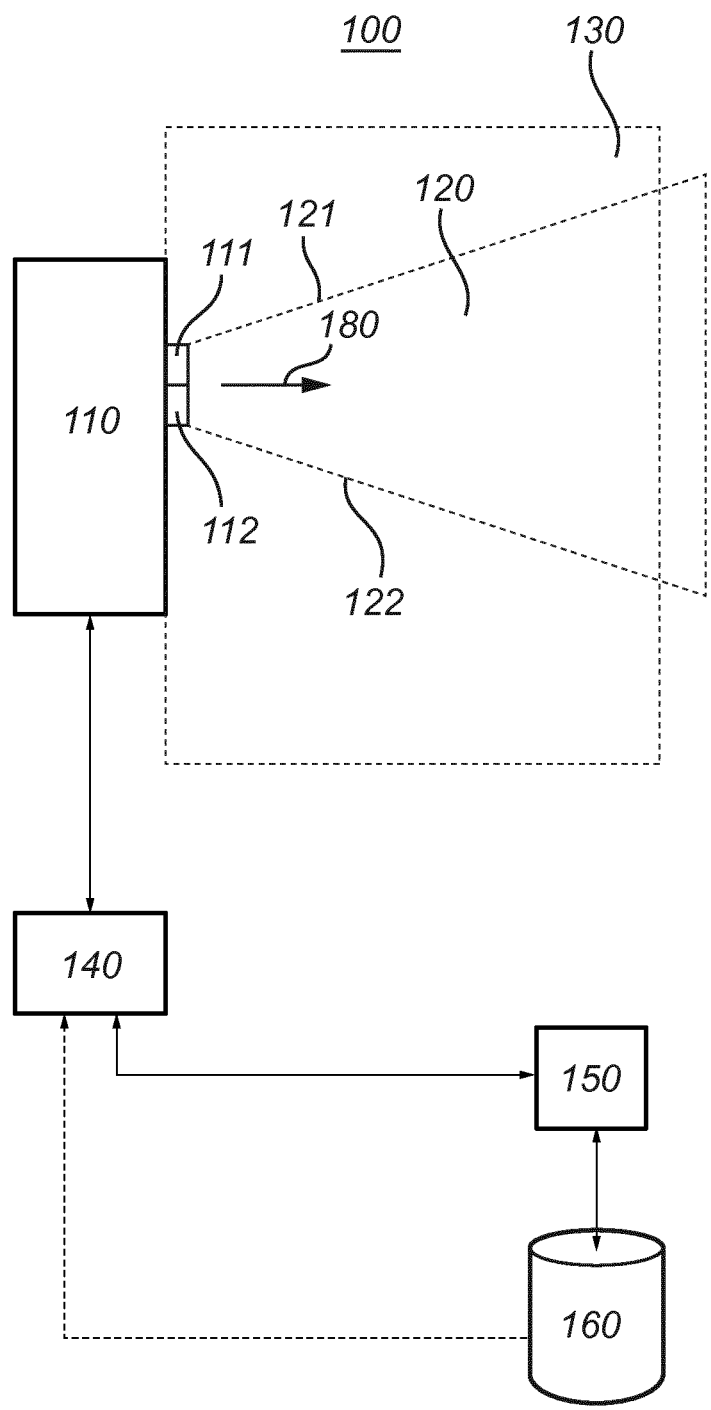

FIGS. 1a and 1b are a schematic view of an aircraft docking system 100 according to a first embodiment of the present invention. The aircraft docking system 100 comprises a laser based verification and positioning system 110 which is adapted to scan a volume 120, or a part of a volume in connection to a stand such as a vertical or horizontal sector as will be disclosed in more detail below, in connection to a stand 130. In FIG. 1, a 2D projection of the volume 120 is indicated by the dashed lines 121, 122. As mentioned earlier, in the following description of preferred embodiments, the system will be disclosed using a laser transmitter as light source for the light based verification and positioning system 110. However, it is emphasized that as an alternative, the docking system may be equipped with radar, a focused light beam or other optical means (e.g. a camera) for scanning the volume.

The laser based verification and positioning system 110 comprises at least one laser transmitter 111 adapted to emit laser pulses in different directions in the volume 120. By way of example, by providing the laser transmitter 111 with two mirrors (not shown) it is possible to aim the laser by reflecting the laser pulses outward over the stand area. One mirror controls the horizontal angle of the laser, while the other mirror controls the vertical angle. Each mirror is controlled by a corresponding step motor, which in turn is controlled by a processor (not shown) in order to perform the scan according to a specific pattern (i.e. aiming the laser pulse in different directions). A detector 112 detects laser pulses that have been reflected by objects within the range of the laser transmitter 111.

According to the present embodiment, the system 110 controls the horizontal mirror to achieve a continuous horizontal scanning within a predetermined angle (e.g. +/− 10 degrees) in fixed steps (e.g. 0.1 degree angular steps). One angular step is taken for each reply from the detector 112. The laser pulses are emitted at a predetermined frequency (e.g. 400 Hz), which provides a new reading from the detector 112 every 2.5 ms. Likewise, the vertical mirror can be controlled to achieve a vertical scan within a predetermined angle (e.g. between +20 and −30 degrees) in fixed steps (e.g. 0.1 degree angular steps) with one step every 2.5 ms.

A more detailed description of the scanning procedure may be found e.g. in U.S. Pat. No. 6,563,432 filed by the present applicant.

In other words, with reference to FIG. 1b, the laser transmitter 111 is adapted to scan the volume 120 in a horizontal direction from one endpoint where the light beam follows the dashed line 121, to another endpoint where the light beam follows the dashed line 122. For each step in the horizontal direction, the laser transmitter 111 is adapted to scan the volume 120 in a vertical direction from one endpoint, e.g. +20 degrees relative the ground plane, to another endpoint, e.g. −30 degrees relative the ground plane. By this procedure a volume 120 with a pyramidal shape with one vertex at the laser transmitter 111 is scanned. In an alternative embodiment, the mirrors may be controlled to scan a volume of a different shape, e.g. a conical shape.

In an alternative embodiment two or more laser transmitters 111 may be used in conjunction and adapted to emit light in different directions such that volumes of other shapes, e.g. rectangular, may be scanned. That is, by way of example, by positioning four laser transmitters 111 and detectors 112 a few meters apart in a rectangular configuration on the terminal building in connection to the stand, and combining the contribution from each transmitter/detector, a greater part of the stand area (especially the edges of the stand area closer to the terminal building) may be efficiently scanned.

The aircraft docking system 100 further comprises a receiving unit 140 adapted to receive surveillance data from an airport surveillance system 150. The airport surveillance system 150 may be remote to the aircraft docking system 100 and shared between a plurality of entities at the airport. Typically the surveillance system observes and tracks aircraft 190 in the air and on the ground (runways and taxiways) and provides situational awareness support for an air control tower 170 at the airport. The surveillance system 150 may also track any other object, such as trucks or pushback tractors at the airport. The surveillance system 150 may also provide data to a central database 160 for further use on displays at the airport, thereby e.g. providing information about arriving aircraft 190 to persons at the airport. In particular, the docking system 100 may retrieve type and/or version of an aircraft from the surveillance system 150 and or central database 160 based on identification data.

The surveillance system 150 may be based on ground movement radar, Digital Airport Surveillance Radar (DASR), Automatic Dependent Surveillance—Broadcast (ADS-B), Mode-S (Select) and/or GPS (Global positioning) systems. The surveillance system 150 may periodically broadcast surveillance data to one or more docking systems at the airport. Alternatively or additionally, a specific docking system may request surveillance data from the surveillance system 150 as needed. The surveillance system 150 may include the above mentioned database 160, wherein the surveillance data is sent from the database 160 to the docking system(s) 100 on request or by broadcast. As an alternative to, or in addition to, sending surveillance data from the database 160, the surveillance system 150 may stream surveillance data to the recipients (e.g. the docking system(s) 100). This embodiment is beneficial should a connection to the database 160 be temporarily unavailable, or in the case where no database 160 is used for providing surveillance data in the system. The received surveillance data comprises identification data, type, version and/or position of an aircraft 190 monitored by the surveillance system 150.

According to one embodiment the surveillance system 150 provides surveillance data comprising information regarding current weather conditions at the airport. The weather information may be used by the docking system 100 for determining the effective range of the laser based verification and positioning system 110. That is, should the provided weather data indicate that the visibility at the airport is severely reduced, e.g. due to fog or heavy rain, the laser based verification and positioning system 110 will know that the effective range of the laser (or other focused light beam) will be reduced such that aircraft 190 at a larger distance will be hard, or even impossible, to detect. The docking system 100 may in such a situation decide to increase the power of the laser should it not yet operate at maximum allowable power, and/or the docking system 100 may alert to the pilot or personnel at the stand that a reliable detection and tracking of the aircraft 190 is not possible. The docking system may decide to use aircraft data (identification data, type, version, position) present in the surveillance data to track the aircraft 190 until a reliable detection by means of the laser based verification and positioning system 110 is possible.

Since the surveillance data provides information about the position of the approaching aircraft, the docking system may make a better interpretation of the data provided by the laser based verification and positioning system 110. That is, scanning data, provided by the laser based verification and positioning system 110 when scanning the volume, which would normally be discarded as unreliable due to the reduced visibility in the stand area (i.e. the reflections from the aircraft are very close to the noise floor in the data signal) may be interpreted using the surveillance data, wherein e.g. an aircraft may be detected in the signal since the docking system "knows" where to look and what to look for.

The laser based verification and positioning system 110 is adapted to control the extension of the scanned volume 120 based on the received surveillance data. In a first example, with reference to the situation above with reduced visibility, the laser based verification and positioning system 110 is adapted to scan a volume extending in a direction radially 180 out from the position of the laser verification and positioning system 110 as indicated by the arrow 180 in FIG. 1b, wherein the laser based verification and positioning system 110 is adapted to reduce the size of the scanned volume by restricting the extension of the volume in the radial 180 direction. This may be done by e.g. only accepting reflected light pulses which have a time-of-flight below a specific threshold. That is, if the laser based verification and positioning system 110 is using time-of-flight as optical distance measurement method, the reflected pulses will return to the detector 112 after $t=2*D/c$ seconds, where c is the speed of light and D is the distance from the transmitter 111 to the reflecting object (i.e. the aircraft 190). By accepting reflected pulses within a time window of e.g. 333.5 ns, objects up to 50 m in the radial direction will be detected. Light pulses arriving at a later time (possibly reflected from an object further away in the radial direction) are rejected as unreliable.

Figure 2:
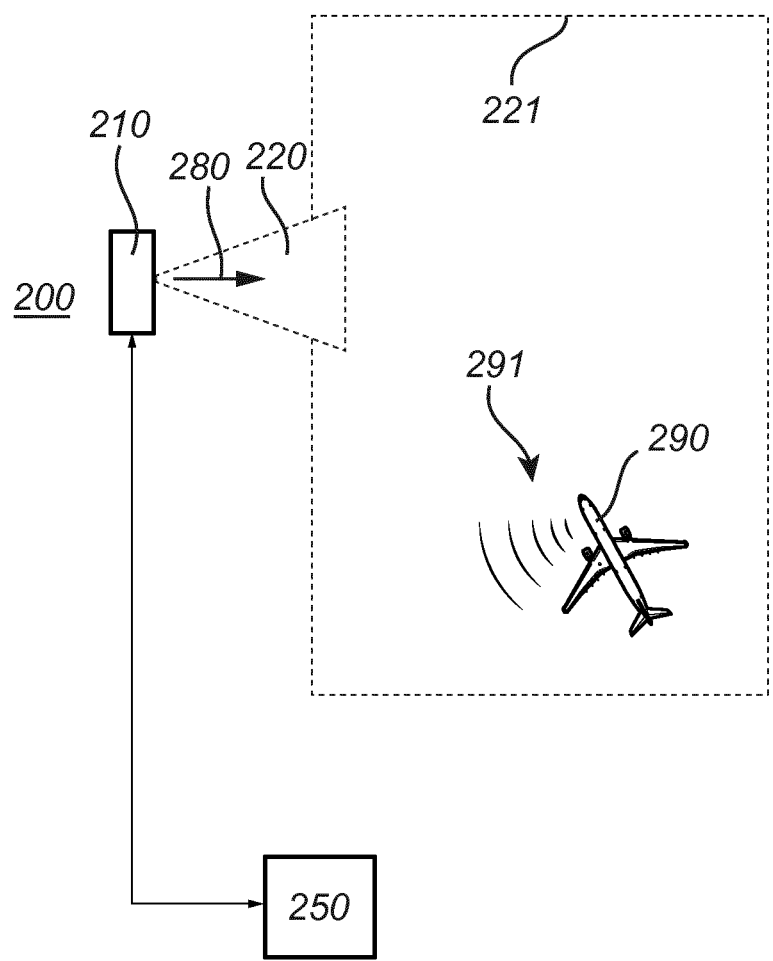
FIG. 2 diagrammatically illustrates a docking system according to a second embodiment of the present invention.

In a second example, with reference to FIG. 2, the laser based verification and positioning system 210 is adapted to scan a volume extending in a direction radially 280 out from the position of the laser verification and positioning system 210 as indicated by the arrow 280 in FIG. 2, wherein the received surveillance data provides information (e.g. identity and position) about aircraft 290 and other objects outside the scanned volume 220 (i.e. outside the effective range of the laser based verification and positioning system 210). In particular, from a docking system 200 perspective the position data provided in the surveillance data is equal to the position data provided by the laser based verification and positioning system 210 in the sense that it tells the docking system where an object is located. By this provision the effective range of the docking system 200, i.e. the range at which the docking system 200 may detect and track an aircraft, is extended.

The aircraft 290 is detected and tracked by the surveillance system 250 e.g. by mans of ADS-B transmissions 291. Thus, the position and identification data relating to the aircraft 290 is known to the surveillance system 250. By providing this information to the docking system 200 and integrating it with the positioning and detection data provided by the laser based verification and positioning system 210, the effective range of the laser based verification and positioning system 210 is synthetically extended to cover the range covered by the surveillance system 250, as indicated by the dashed line 221 in FIG. 2. It is understood that this area/volume covered by the surveillance system 250 may be significantly larger than the area/volume covered by the laser based verification and positioning system 210. Thus, from a point of view from the docking system 200, the effective range of the laser based verification and positioning system 210 is greatly extended.

Additionally, should the surveillance data indicate that no other objects are in the path between the laser based verification and positioning system 210 and the aircraft 290, the laser based verification and positioning system 210 may increase the transmission power of the laser in order to extend the actual range of the laser based verification and positioning system 210. However, care has to be taken such that the transmission power of the laser is not increased to levels that may be harmful to any personnel being present in area between the laser based verification and positioning system 210 and the aircraft. Alternatively, regulations may prescribe that personnel may not enter the area between the laser based verification and positioning system 210 and the aircraft 290 during the early stages of the approach (when the aircraft is far away and hence the transmission power is increased). The transmission power of the laser may then be reduced as the aircraft approaches the stand area.

In an alternative embodiment, the docking system 200 provides scanning data (e.g. position and type of aircraft), received from the laser based verification and positioning system 210, to the surveillance system 250. As mentioned earlier, the surveillance system may normally determine the position of an aircraft on the runway or taxiway with high precision, but as the aircraft approaches the stand area, in particular in the vicinity of terminal buildings, the accuracy of the position data from the surveillance system deteriorates due to the presence of e.g. buildings or other structures that interfere with the sensors in the surveillance system (i.e. blocking radar pulses, causing misreading by reflections etc.). By providing the scanning data from the docking system 210 to the surveillance system 250, the surveillance system 250 will be able to track an aircraft with high precision also in the stand area even though other sensors being part of the surveillance system 250 fail in providing reliable data.

Figure 3:
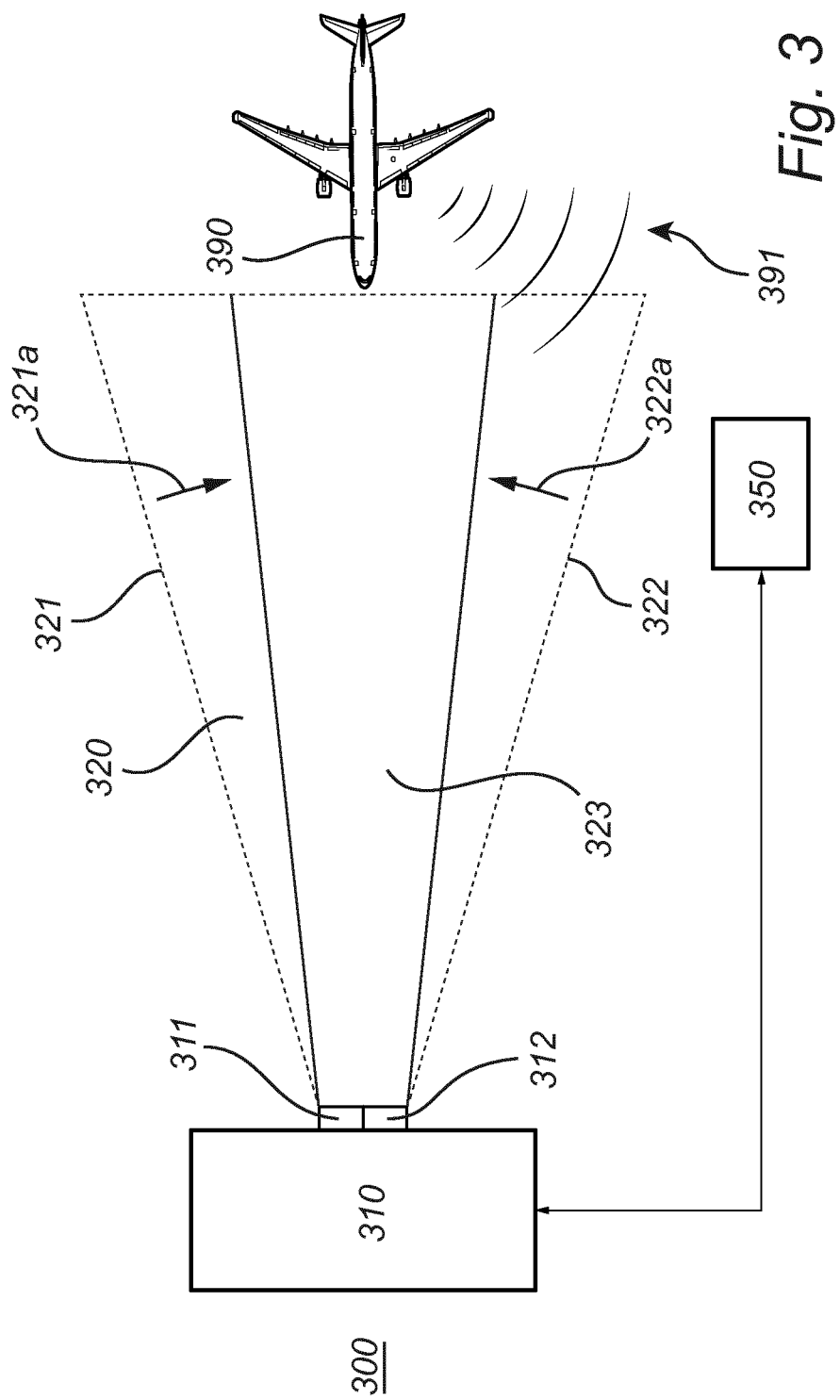
FIG. 3 diagrammatically illustrates a docking system according to a third embodiment of the present invention.

As disclosed above, the size of the scanned volume may be reduced in a radial direction. With reference to FIG. 3, the laser based verification and positioning system 310 may be adapted to scan a volume 320 extending in a direction radially out from the laser based verification and positioning system 310 and in a direction transverse to the radial direction, wherein the laser based verification and positioning system 310 is adapted to reduce the size of the scanned volume 320 by restricting the extension of the volume 320 in the transverse direction.

An aircraft 390 is detected and tracked by the surveillance system 350 e.g. by means of ADS-B transmissions 391. Thus, the position and identification data relating to the aircraft 390 is known to the surveillance system 350. By providing this information to the docking system 300, the docking system 300 knows where to expect the aircraft 390 even before the aircraft 390 enters into the effective range of the laser based verification and positioning system 310 (i.e. outside the scanned volume 320). Additionally, since the surveillance data may comprise identification data relating to the aircraft 390, the docking system 300 not only knows where to look for the aircraft 390, but also what type of aircraft 390 to look for. Hence, the laser based verification and positioning system 310 need not blindly scan the volume in its search for the aircraft 390.

Using the knowledge about the position of the aircraft, the laser based verification and positioning system 310 may reduce the size of scanned volume 320 by controlling the mirrors in the laser transmitter 311 such that the horizontal endpoints 321 and 322 are moved inwards, as indicated by the arrows 321a and 322a in FIG. 3, such that a smaller volume 323 is scanned. When restricting the extension of the size of the scanned volume 323, the docking system may choose to increase the resolution of the scan, i.e. reduce the angular step size of the mirrors by reducing the step size of the step motors. Alternatively, the angular step size may be unaltered, wherein time for scanning the restricted volume will be increased due to fewer horizontal steps per scan. As yet an alternative a combination of both previous embodiments may be implemented, i.e. the laser based verification and positioning system 310 may reduce the number of steps and reduce the angular step size such that a suitable trade-off between resolution and scanning speed is achieved.

Figure 4:
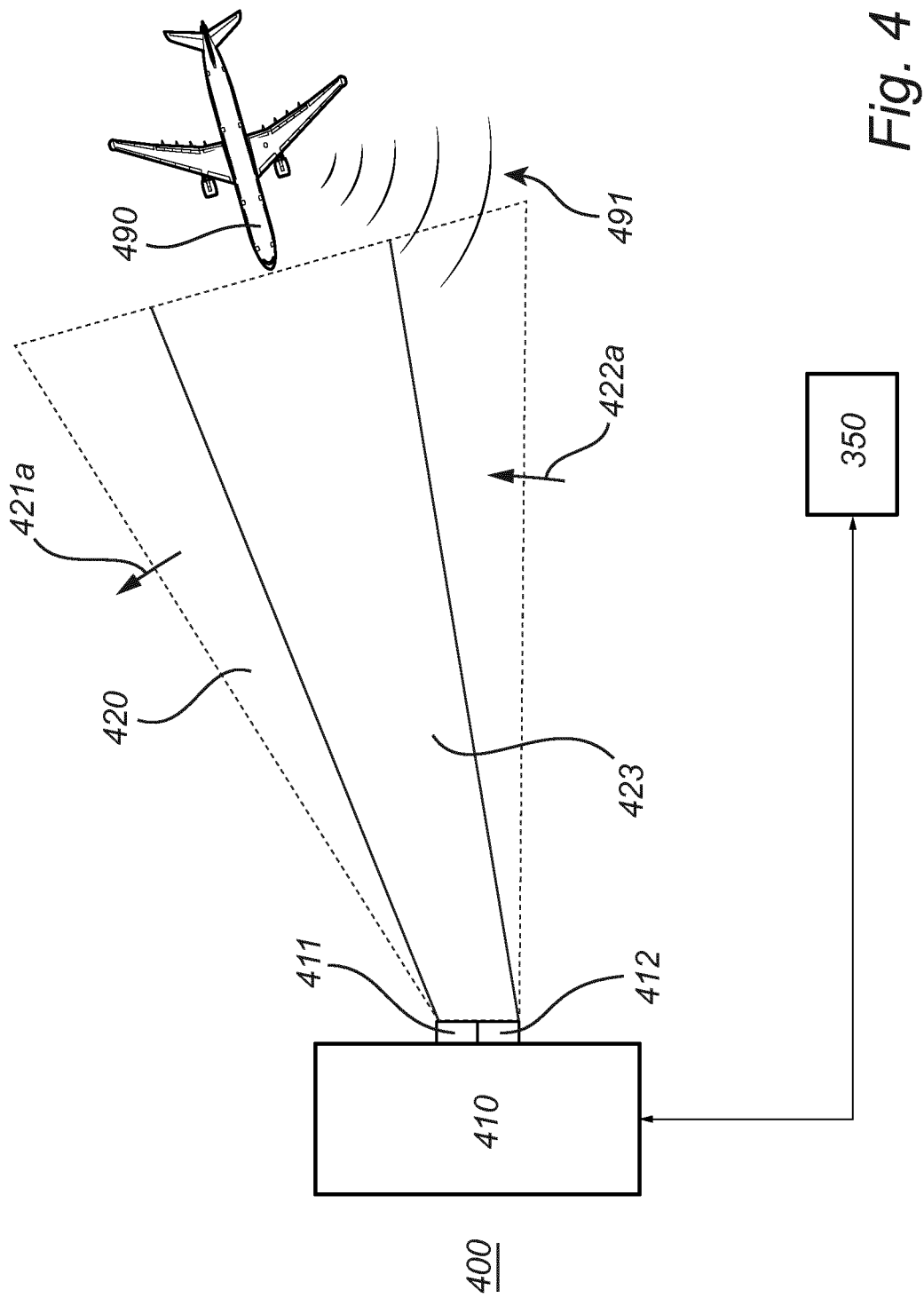
FIG. 4 diagrammatically illustrates a docking system according to a fourth embodiment of the present invention.

With reference to FIG. 4, the laser based verification and positioning system 410 may be adapted to shift the scanned volume 420 sideways based on the received surveillance data.

An aircraft 490 is detected and tracked by the surveillance system 450 e.g. by mans of ADS-B transmissions 491. Thus, the position and identification data relating to the aircraft 490 is known to the surveillance system 450. By providing this information to the docking system 400, the docking system 400 know where to expect the aircraft 490 even before the aircraft 490 enters into the effective range of the laser based verification and positioning system 410 (i.e. outside the scanned volume 420). Additionally, since the surveillance data may comprise identification data relating to the aircraft 490, the docking system 400 not only knows where to look for the aircraft 490, but also what type of aircraft 490 to look for.

Using the knowledge about the position of the aircraft, the laser based verification and positioning system 410 may shift the entire scanned volume 420 sideways by controlling the mirrors in the laser transmitter 411 such that the horizontal endpoints 421 and 422 are moved sideways, as indicated by the arrows 421a and 422a in FIG. 4, such that the size of the scanned volume 420 is not changed, but rather the angular orientation of the scanned volume 420 is changed. That is, without restricting the transversal/angular width of the scanned volume 420, the laser based verification and positioning system 410 may more reliably detect the aircraft 490 by scanning a volume 420 where the aircraft 490 is expected. Additionally, as disclosed in detail above, the transversal movement of the scanned volume 420 may be combined with a restriction of the scanned volume 420 such that a smaller volume 423 is scanned.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. An aircraft docking system comprising:
a light based verification and positioning system adapted to monitor an aircraft expected to arrive at a stand, in a volume in connection to the stand, wherein the monitoring includes detecting and tracking of the aircraft, said monitored volume comprising at least a scanned volume being scanned by the light based verification and positioning system,
said aircraft docking system further comprising
a receiving unit adapted to receive surveillance data including position data related to the aircraft from an airport surveillance system,
wherein the light based verification and positioning system is further adapted to:
control the extension of the scanned volume based on the received position data,
reduce the size of the scanned volume based on the received surveillance data, and
shift at least a portion of the scanned volume sideways based on the received surveillance data.

2. Aircraft docking system according to claim 1, wherein the light based verification and positioning system comprises at least one laser transmitter adapted to emit light in different directions in the scanned volume, and a detector adapted to detect light reflected from objects in the scanned volume.

3. Aircraft docking system according to claim 1, wherein the light based verification and positioning system is adapted to scan a volume extending in a direction radially out from the light verification and positioning system, the light based verification and positioning system adapted to reduce the size of the scanned volume by restricting the extension of the volume in the radial direction.

4. Aircraft docking system according to claim 1, wherein the light based verification and positioning system is adapted to scan a volume extending in a direction radially out from the light based verification and positioning system and in a direction transverse to the radial direction, the light based verification and positioning system adapted to reduce the size of the scanned volume by restricting the extension of the volume in the transverse direction.

5. Aircraft docking system according to claim 1, wherein the received surveillance data comprises at least one of: identification data, type and version of an aircraft.

6. Aircraft docking system according to claim 1, wherein the received surveillance data comprises information regarding current weather conditions at the airport.

7. Aircraft docking system according to claim 1, wherein the surveillance system is at least one of: ground movement radar, ADS-B, Mode-S and GPS systems.

8. Aircraft docking system according to claim 1, wherein the light based verification and positioning system is adapted to verify the aircraft in the scanned volume.

9. Aircraft docking system according to claim 1, wherein the light based verification and positioning system is adapted to verify at least one of identification data, type, and version of the aircraft.

10. Aircraft docking system according to claim 1, wherein the light based verification and positioning system is adapted to retrieve type and/or version of the aircraft from a database based on said identification data.

11. Aircraft docking system according to claim 1, comprising an interface adapted to provide aircraft data to the surveillance system.

12. Aircraft docking system according to claim 11, wherein the interface is adapted to provide aircraft data to the surveillance system via a database.

13. Aircraft docking system (100,200,300,400) according to claim 11, wherein the aircraft data comprise at least one of: verified identification data, type, version and position of the aircraft.

\* \* \* \* \*